United States Patent [19]

Babu et al.

[11] Patent Number: 5,282,237
[45] Date of Patent: Jan. 25, 1994

[54] TRUNK CABLE FAULT DETECTION AND RECONFIGURATION ARRANGEMENT IN A RING COMMNICATIONS NETWORK

[75] Inventors: K. C. Babu, Kerala, India; Michael S. Cohen, Enola; Thomas A. Donnelly, Harrisburg, both of Pa.; Kumar K. R. Hemant, Bangalore, India; Bret A. Matz, Harrisburg, Pa.

[73] Assignee: The Whitaker Corporation, Wilmington, Del.

[21] Appl. No.: 753,525

[22] Filed: Sep. 3, 1991

[51] Int. Cl.$^5$ ............................................. H04M 3/08
[52] U.S. Cl. .................................... 379/2; 370/85.12; 370/85.15
[58] Field of Search .................. 370/85.12, 85.15, 16; 340/825.05, 825.06; 379/2, 12, 24, 333

[56] References Cited

U.S. PATENT DOCUMENTS

| | | | |
|---|---|---|---|
| 4,899,142 | 2/1990 | Nakayashiki et al. | 370/85.15 |
| 4,964,120 | 10/1990 | Mostashari | 370/16 |
| 5,081,452 | 1/1992 | Cozic | 340/825.5 |
| 5,132,832 | 7/1992 | Matz et al. | 370/85.5 |
| 5,199,026 | 3/1993 | Lund | 370/56 |

FOREIGN PATENT DOCUMENTS

| | | |
|---|---|---|
| 0205968 | 12/1986 | European Pat. Off. . |
| 0374670 | 6/1990 | European Pat. Off. . |
| 471633A | 2/1992 | European Pat. Off. .......... 370/85.12 |
| 72743 | 3/1991 | Japan ................................ 370/85.12 |

OTHER PUBLICATIONS

ANSI/IEEE Std 802.5-1985 pp. 77-80.

Primary Examiner—James L. Dwyer
Assistant Examiner—Ahmad F. Matar

[57] ABSTRACT

A ring communications network having a plurality of line concentrators (10) each including a ring-in port (16), a ring-out port (18), and a plurality of station ports (20), includes the feature of being able to detect a fault in the trunk cable between concentrators and reconfiguring the ring to bypass that fault. Fault detection is accomplished by injecting a phantom DC voltage at the ring-out port and sensing whether current due to that voltage is present at both the ring-out port and the ring-in port of the next adjacent concentrator in the ring.

12 Claims, 6 Drawing Sheets

TRUNK CABLE FAULT DETECTION AND RECONFIGURATION ARRANGEMENT IN A RING COMMNICATIONS NETWORK

BACKGROUND OF THE INVENTION

This invention relates to ring communications networks and, more particularly, to an arrangement which is capable of detecting a fault in the trunk cable and reconfiguring the ring to bypass the fault.

In ring communications networks, such as for example those conforming to the IEEE Standard 802.5-1989 covering token ring networks, a plurality of line concentrators are connected together in a closed loop (i.e., a ring) by means of a trunk cable. Each concentrator includes a plurality of station ports to which a terminal, such as a computer, may be connected for communication over the ring with other such terminals in the network. Each concentrator also has a ring-in port and a ring-out port for interfacing with the trunk cable connected between the concentrators.

The trunk cable typically includes four wires, two of which make up the main connection path, with the other two making up an auxiliary connection path. The main connection path passes through all of the ports of all of the concentrators and provides a data communications channel in a first direction around the ring, data signals transmitted over the ring being AC coupled to the concentrators and the stations. The auxiliary connection path passes through the ring-in and ring-out ports of all of the concentrators but does not pass through any of the station ports of the concentrators. This auxiliary connection path carries data signals in the opposite direction around the ring upon detection of a fault in the trunk cable between two concentrators and the subsequent looping back of the ring to bypass that fault. Various arrangements have been proposed for detecting a fault in the trunk cable between concentrators. For example, check pulses are sometimes transmitted around the ring. Another arrangement measures current imbalances. Still another arrangement looks for the presence of a carrier signal. It is a primary object of the present invention to provide a fault detection system which is simple and economical to implement and does not involve the complexity of known systems.

SUMMARY OF THE INVENTION

The foregoing, and additional, objects are attained in accordance with the principles of this invention by providing an arrangement whereby circuitry in the ring-out port of one concentrator impresses a phantom DC voltage on the trunk cable connected to the next adjacent concentrator in the ring. Both that ring-out port and the ring-in port of the next adjacent concentrator contain circuitry for detecting the presence of current due to the impressed voltage. If such current is not detected, this indicates a fault in the trunk cable and the ring-in and ring-out ports cause the main and auxiliary connection paths to be looped back so as to bypass the fault.

BRIEF DESCRIPTION OF THE DRAWING

The foregoing will be more readily apparent upon reading the following description in conjunction with the drawings in which like elements in different figures thereof are identified by the same reference numeral and wherein.

DETAILED DESCRIPTION

Figure 1:
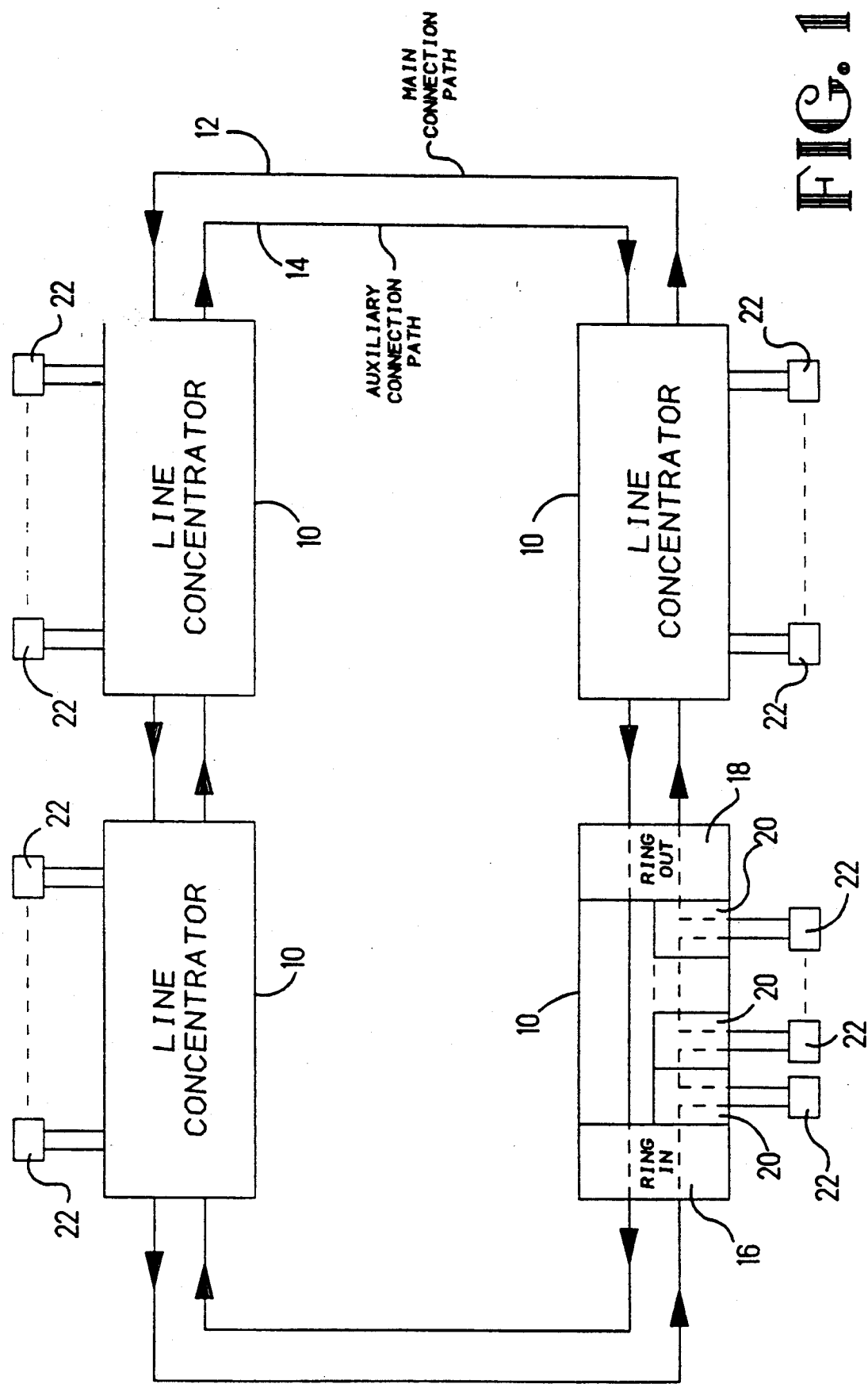
FIG. 1 is a block diagram illustrating a ring communications network in which the principles of this invention may be applied.

Referring now to the drawings, FIG. 1 shows a ring communication network wherein a plurality of line concentrators 10 are connected together in a ring by a trunk cable including a main connection path 12 and an auxiliary connection path 14. Each of the concentrators 10 has a plurality of ports including a ring-in port 16, a ring-out port 18, and a plurality of station ports 20. A plurality of data stations 22 are each connected to a respective station port 20 and may be selectively inserted into the communications network in accordance with a protocol established for the particular type of network such as, for example, the IEEE Standard 802.5-1989 for token ring networks. As shown in FIG. 1, the main connection path 12 enters a concentrator 10 through its ring-in port 16 and extends through all of its station ports 20 before exiting the concentrator 10 through its ring-out port 18 Somewhat differently, the auxiliary connection path 14 enters a concentrator 10 through its ring-out port 18 and extends directly to its ring-in port 16, from which it exits the concentrator 10.

Figure 2:
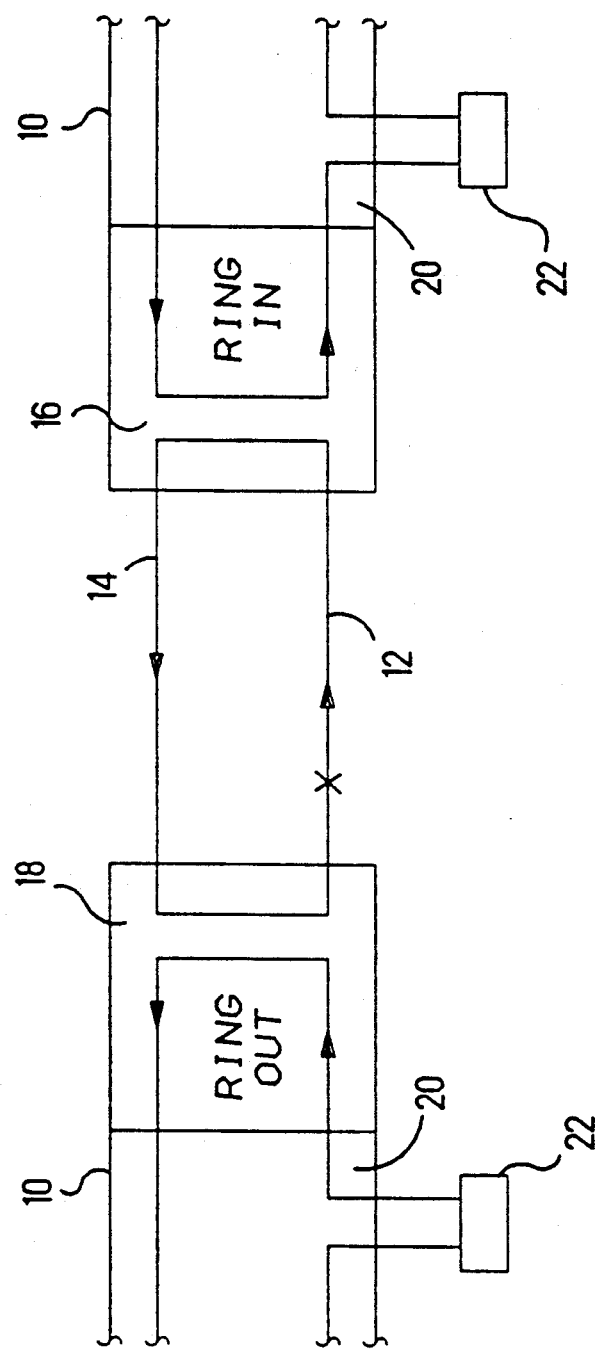
FIG. 2 shows a portion of the network of FIG. 1 wherein a fault has been detected and the ring has been placed in a loop-back configuration.

FIG. 2 illustrates the reconfiguration of the network of FIG. 1 when a fault is detected in the trunk cable. Illustratively, if there is a fault in the main connection path 12 between two adjacent concentrators 10, as denoted by the "X", both the ring-out port 18 and the ring-in port 16 adjacent that section of the trunk cable will bypass that section of cable by connecting together the main connection path 12 and the auxiliary connection path 14 in two places and breaking the connection of the concentrator 10 to the faulty section of cable. Thus, the ring-out port 18 shown in FIG. 2 will be connected to the ring-in port 16 shown in FIG. 2 by the auxiliary connection path 14 which extends through all of the line concentrators 10, instead of being directly connected by the main connection path 12 which directly couples the two line concentrators 10.

Figure 3:
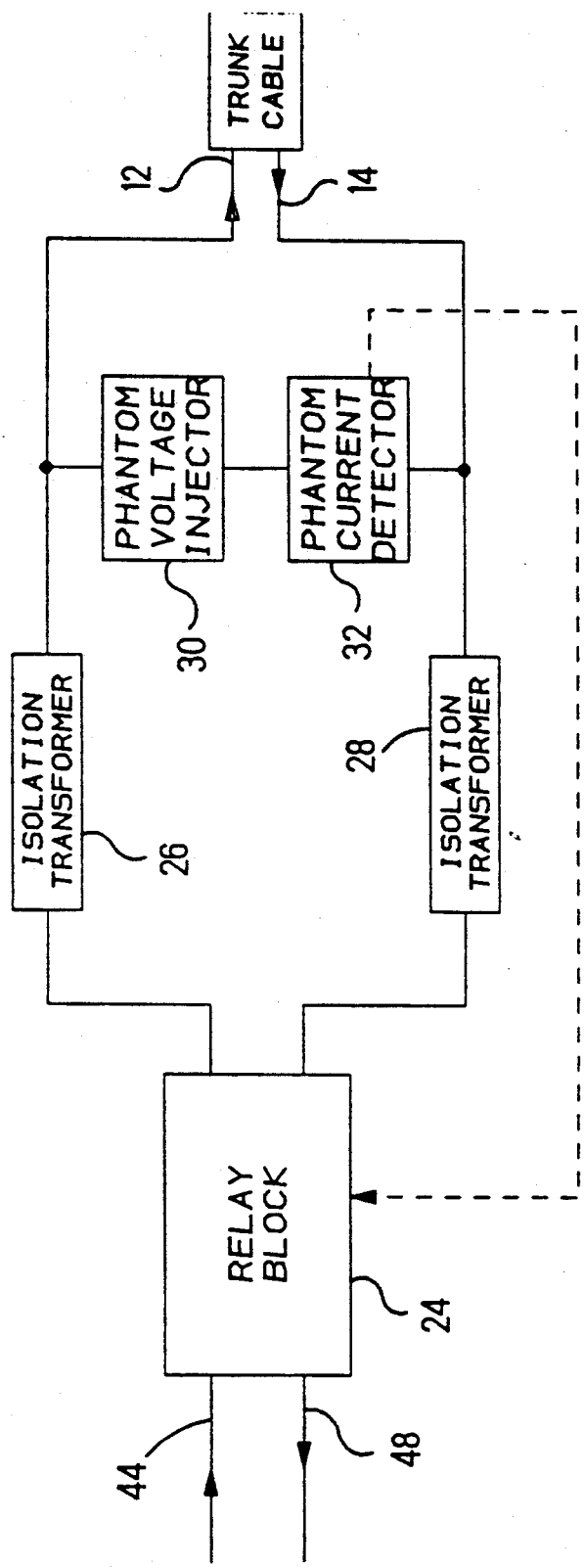
FIG. 3 is a simplified block diagram of a portion of a ring-out port of a concentrator containing circuitry constructed in accordance with the principles of this invention.

FIG. 3 illustrates a ring-out port 18 which incorporates circuitry according to this invention for detecting such a fault. Thus, as is conventional, the ring-out port 18 includes a relay block 24 and isolation transformers 26 and 28 connected to the main connection path 12 and the auxiliary connection path 14 of the trunk cable. The relay block 24 provides circuitry for making appropriate connections. Since the data communicated around the ring is AC coupled, the isolation transformers 26, 28 insure that only such AC coupled signals are permitted to pass between the line concentrator 10 and the trunk cable. To detect a fault in the cable, a phantom voltage injector 30 and a phantom current detector 32 are provided. The phantom voltage injector 30 provides a fixed DC voltage on the cable, which cannot pass the isolation transformers 26, 28 into the remainder of the concentrator, and the phantom current detector 32 determines whether current due to that phantom voltage is present on the cable. (The impressed DC voltage is transparent to the passage of the AC coupled data signals, hence the name "phantom".) The absence of such phantom current indicates a break in the cable and under these circumstances, the relay block 24 is controlled to reconfigure the connections to the ring, as shown in FIG. 2.

Figure 4:
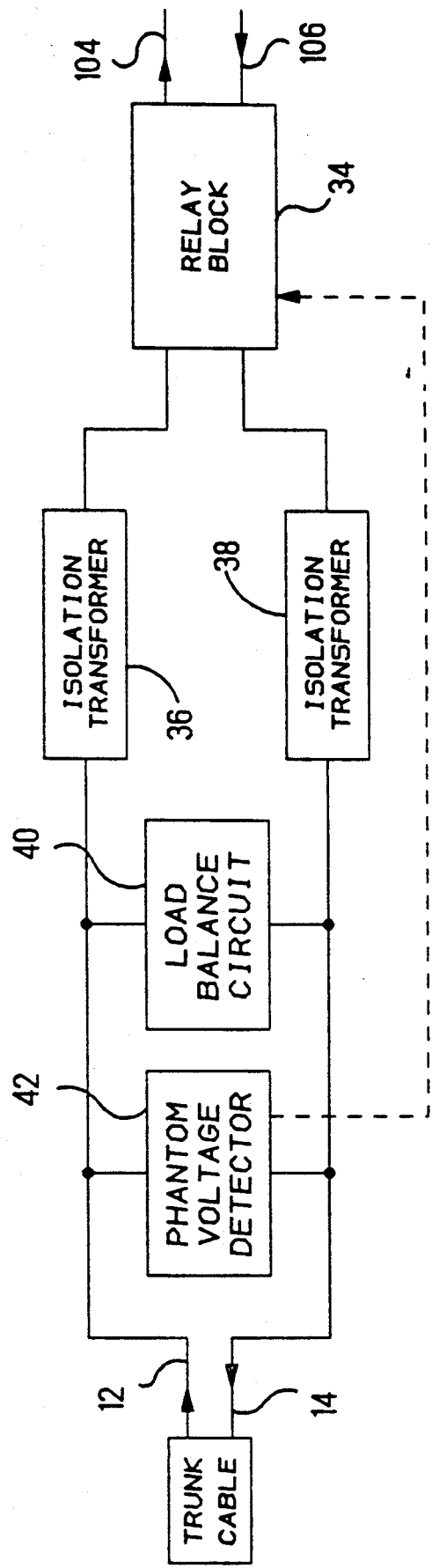
FIG. 4 is a simplified block diagram of a portion of a ring-in port of a concentrator containing circuitry constructed in accordance with the principles of this invention.

FIG. 4 illustrates a ring-in port 16 arranged according to this invention for detecting a cable fault. Thus, the ring-in port includes a relay block 34 and isolation transformers 36 and 38, as is conventional, connected to the main connection path 12 and the auxiliary connection path 14 of the trunk cable. In addition, as is conventional, a load balance circuit 40 is also provided. According to this invention, a phantom voltage detector 42 is provided for determining whether current due to the phantom voltage injected on the cable by the phantom voltage injector 30 (FIG. 3) of the ring-out port of the adjacent concentrator is present. If such phantom voltage induced current is not detected, the relay block 34 is controlled to reconfigure the ring-in port 16 as shown in FIG. 2

Figure 5:
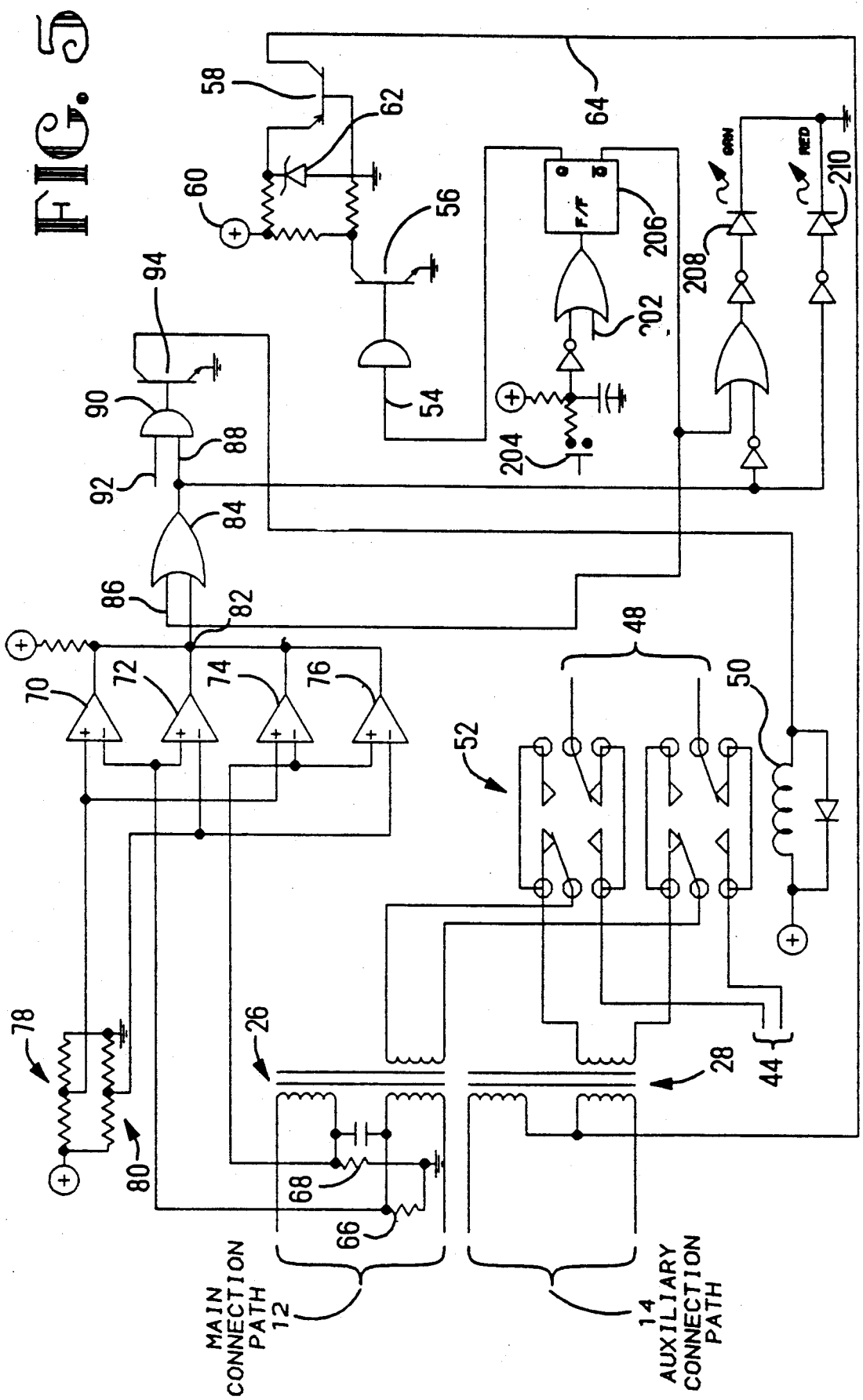
FIG. 5 is a detailed schematic diagram showing the portion of the ring-out port of FIG. 3.

FIG. 5 shows illustrative circuitry within a ring-out port 18, according to this invention. Thus, the main connection path 12 of the trunk cable is connected to a winding of the isolation transformer 26 and the auxiliary connection path 14 is connected to a winding of the isolation transformer 28. Both of the paths 12 and 14 are two-wire paths. Within the ring-out port 18, the wire pair 44 is the main ring-out path from the concentrator 10 which, during normal operation, is coupled to the main connection path 12 of the cable through the transformer 26. The wire pair 48 is the auxiliary path through the concentrator 10 which, during normal operation, is coupled to the auxiliary connection path 14 of the cable through the transformer 28. The relay coil 50 and its bank of contacts 52 control whether the ring-out port 18 is in its normal connection mode as shown in FIG. 1 or in its looped back reconfiguration mode as shown in FIG. 2. In FIG. 5, the relay coil 50 is shown as not being energized so that its bank of contacts 52 is in the loop-back mode of FIG. 2. Thus, in this mode, the main wire pair 44 of the concentrator is directly connected to the auxiliary wire pair 48 of the concentrator, and the main connection path 12 of the cable is coupled to the auxiliary connection path 14 of the cable through the transformer 26 and the transformer 28.

When the fault detection arrangement is activated, a high fault detection enable signal is applied to the lead 54. The generation of this enable signal is controlled by either the Network Management System (not shown), which controls the overall operation of the ring communications network, via the lead 202 or manually through the momentary contact switch 204. Operation of the switch 204 or a pulse applied to the lead 202 causes the flip-flop 206 to toggle, to place the lead 54 at the desired level. If the adjacent ring-in port 16 is not set up to detect the phantom current, then the enable signal is not generated. (An additional use of the phantom voltage may be for determining ring topology.) When there is a high signal on the lead 54, the transistor 56 is turned on, causing the transistor 58 to become conductive. The phantom DC voltage from the supply 60, as regulated by the Zener diode 62, is then applied over the lead 64 through the winding of the transformer 28 to the two wires making up the auxiliary connection path 14. The return path for this voltage is through the adjacent ring-in port 16, through the two wires of the main connection path 12, through the windings of the transformer 26, through the resistors 66 and 68, to ground, assuming that there is no fault in any of the connections. The circuitry within the ring-out port 18 for checking whether current due to the phantom voltage injected over the lead 64 is present includes the comparators 70, 72, 74 and 76. The comparators 70 and 72 check the current through the resistor 66 and the comparators 74 and 76 check the current through the resistor 68, by examining the voltages at the ends of the respective resistors remote from ground. These voltages are compared against upper and lower limits derived from the voltage dividers 78 and 80, respectively. When both of the currents are within limits, the outputs of the comparators 70-76 at the junction point 82 are high. If either of the currents should go out of limit, the signal at the junction point 82 will go low. The junction point 82 is connected to one input of the OR gate 84. The other input to the OR gate 84 on the lead 86 is low when the fault detection circuitry is to be enabled. When either of the signals at the inputs of the OR gate 84 is high, the output on the lead 88 to one input of the AND gate 90 is high. The other input to the AND gate 90 on the lead 92 is high when the ring-out port 18 is connected to a trunk cable. When both inputs to the AND gate 90 are high, the transistor 94 becomes conductive, thereby energizing the relay coil 50 and switching the bank of contacts 52 to the normal connection state, as described above.

If either of the currents through the resistors 66 and 68 is out of limits, the junction 82 is low. With the lead 86 also being low, indicating that fault detection is enabled, this means that the lead 88 is low and the transistor 94 is non-conductive. This is the condition where a fault in the trunk cable has been detected and therefore the relay coil 50 is not energized, so that the bank of contacts 52 is as shown in FIG. 5. Accordingly, the ring is looped back as shown in FIG. 2. If there is a trunk cable connected to the ring out port 18 so that the lead 92 is high, and fault detection is to be disabled, a high signal is placed on the lead 86. This causes a high signal to be placed on the lead 88 and the transistor 94 becomes conductive, energizing the relay 50 and taking the ring-out port out of the looped back configuration, independent of detection of current.

An indicating arrangement is provided to indicate the fault detection status of the ring-out port 18. This indicating arrangement includes the green light emitting diode 208 and the red light emitting diode 210, along with associated circuitry. If neither of the diodes 208, 210 is lit, this indicates that the fault detection circuitry for the ring-out port 18 is disabled. If the green light emitting diode 208 is lit, this indicates that the fault detection circuitry is enabled and no ring-out fault has been detected. If the red light emitting diode 210 is lit, this indicates that the fault detection circuitry is enabled and a ring-out fault has been detected.

Figure 6:
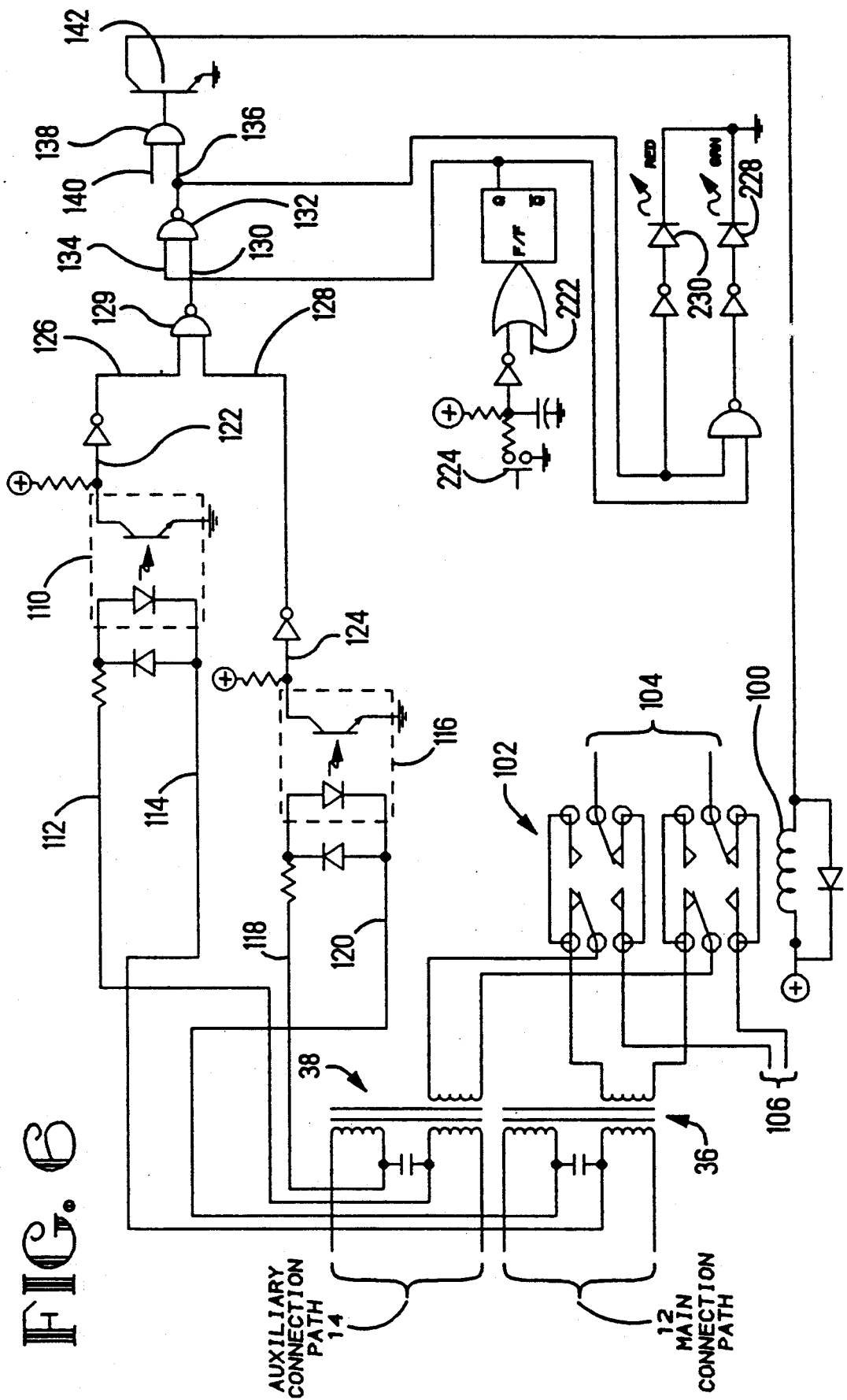
FIG. 6 is a detailed schematic diagram showing the portion of the ring-in port of FIG. 4.

FIG. 6 illustrates the fault detection circuitry in the ring-in port 16. As with the ring-out port, the ring-in port 16 includes a relay having a coil 100 and a bank of contacts 102 configured so that when the coil 100 is not energized, as shown in FIG. 6, the bank of contacts 102 connects the main wire pair 104 directly to the auxiliary wire pair 106 to place the ring-in port in the looped back configuration shown in FIG. 2. At the same time, the main connection path 12 of the cable is coupled to the auxiliary connection path 14 of the cable through the transformer 36, through the bank of contacts 102 and through the transformer 38.

As previously discussed with regard to FIG. 5, the phantom voltage is applied between the auxiliary connection path 14 and the main connection path 12 in the ring-out port 18. Therefore, in the ring-in port 16, as shown in FIG. 6, current due to the application of the phantom voltage is detected by the opto-isolator 110 connected between the lead 112 of the auxiliary connection path 14 and the lead 114 of the main connection path 12; and the opto-isolator 116 connected between the lead 118 of the auxiliary connection path 14 and the lead 120 of the main connection path 12. With such current present, the leads 122 and 124 are low and the leads 126 and 128 are high. The leads 126 and 128 are the inputs to the NAND gate 129 and, when they are both high, this causes the lead 130 to be low. The lead 130 is connected to one input of the NAND gate 132, the other input of which on the lead 134 is high when the fault detection circuitry is enabled. As with the ring-out port 18, the fault detection circuitry of the ring-in port 16 may be selectively enabled or disabled either by the Network Management System via the lead 222 or manually through the momentary contact switch 224. With the lead 130 being low, the output of the NAND gate 132 on the lead 136 is high. The lead 136 is one input to the AND gate 138, the other input of which on the lead 140 is high when the ring-in port is connected to a trunk cable. Therefore, the transistor 142 will become conductive to energize the relay coil 100 and switch the bank of contacts 102. With the bank of contacts 102 switched, the main wire pair 104 of the concentrator will be connected through the transformer 36 to the main connection path 12 of the cable and the auxiliary wire pair 106 of the concentrator will be connected through the transformer 38 to the auxiliary connection path 14 of the cable.

If the ring-in fault detection feature is to be disabled, the signal on the lead 134 is low, thereby causing the lead 136 to remain high, independent of the output of the current detectors on the lead 130. This insures that the relay coil 100 remains energized so long as a trunk cable is present at the ring-in port.

An indicating arrangement is provided to indicate the fault detection status of the ring-in port 16. This indicating arrangement includes the green light emitting diode 228 and the red light emitting diode 230, along with associated circuitry. If neither of the diodes 228, 230 is lit, this indicates that the fault detection circuitry for the ring-in port 16 is disabled. If the green light emitting diode 228 is lit, this indicates that the fault detection circuitry is enabled and no ring-in fault has been detected. If the red light emitting diode 230 is lit, this indicates that the fault detection circuitry is enabled and a ring-in fault has been detected.

Accordingly, there has been disclosed an improved trunk cable fault detection and reconfiguration arrangement in a ring communications network. This arrangement possesses the advantages, among others, that it is simple and economical to implement, it is operative during data communications and it does not require the interruption of any such communications. While an illustrative embodiment of the present invention has been disclosed herein, it will be apparent to those of ordinary skill in the art that various modifications and adaptations to that embodiment are possible and it is only intended that the present invention be limited by the scope of the appended claims.

We claim:

1. An arrangement for maintaining the integrity of a connection ring between a plurality of line concentrators (10) in a ring communications network, each of said line concentrators including a ring-in port (16), a ring-out port (18), a plurality of station ports (20), a main connection path (44, 104) extending from said ring-in port through said station ports to said ring-out port, and an auxiliary connection path (48, 106) extending directly from said ring-out port to said ring-in port, the connection ring including a trunk cable (12, 14) extending from a ring-out port of a first line concentrator to the ring-in port of a second line concentrator, the trunk cable having a main portion (12) connecting the main connection path of said first line concentrator to the main connection path of said second line concentrator and an auxiliary portion (14) connecting the auxiliary connection path of said first line concentrator to the auxiliary connection path of said second line concentrator, with data communicated between said line concentrators being AC coupled through said ring-out ports and said ring-in ports, the arrangement comprising:

voltage providing means (30) in said ring-out port of said first line concentrator for providing a fixed voltage on said trunk cable;

first detecting means (32) in said ring-out port of said first line concentrator for detecting whether current due to said fixed voltage is present in said ring-out port;

second detecting means (42) in said ring-in port of said second line concentrator for detecting whether current due to said fixed voltage is present in said ring-in port;

first reconnecting means (50, 52) in said ring-out port (18) of said first line concentrator responsive to said first detecting means for connecting within said ring-out port the main connection path (44) of said first line concentrator to the auxiliary connection path (48) of said first line concentrator in the absence of current due to said fixed voltage; and second reconnecting means (100, 102) in said ring-in port of said second line concentrator responsive to said second detecting means for connecting within said ring-in port the main connection path (104) of said second line concentrator to the auxiliary connection path (106) of said second line concentrator in the absence of current due to said fixed voltage.

2. The arrangement according to claim 1 wherein:

said first reconnecting means is further operative in the absence of current due to said fixed voltage for connecting the main portion (12) of said trunk cable to the auxiliary portion (14) of said trunk cable; and said second reconnecting means is further operative in the absence of current due to said fixed voltage for connecting the main portion (12) of said trunk cable to the auxiliary portion (14) of said trunk cable.

3. The arrangement according to claim 1 wherein said voltage providing means (30) applies a voltage between said auxiliary connection path (14) and said main connection path (12) of said trunk cable.

4. The arrangement according to claim 1 wherein said first detecting means (32) includes;
- means (66, 68) for providing a detection voltage corresponding to current due to said fixed voltage;
- means (78) for providing an upper limit voltage;
- means (80) for providing a lower limit voltage; and
- means (70, 72, 74, 76) for comparing said detection voltage to said upper limit voltage and said lower limit voltage and providing a current detection signal when said detection voltage is between said upper limit voltage and said lower limit voltage.

5. The arrangement according to claim 4 wherein said first reconnecting means includes:
- a relay having a coil (50) and a bank of contacts (52), said bank of contacts when in a first state due to the energization of said coil coupling the main connection path of the concentrator to the main connection path of the trunk cable and coupling the auxiliary connection path of the concentrator to the auxiliary connection path of the trunk cable, said bank of contacts when in a second state due to said coil not being energized coupling the main connection path of the concentrator to the auxiliary connection path of the concentrator and coupling the main connection path of the trunk cable to the auxiliary connection path of the trunk cable; and
- means (84, 90, 94) responsive to the presence of said current detection signal for energizing said relay coil (50).

6. The arrangement according to claim 5 wherein said first reconnecting means further includes means (86, 84) for maintaining said relay coil (50) in an energized state independent of said current detection signal.

7. The arrangement according to claim 3 wherein said second detecting means (42) includes:
- opto-isolator means (110, 116) coupled between the auxiliary connection path and the main connection path of the trunk cable; and
- means (129) coupled to said opto-isolator means for providing a current detection signal upon the flow of current through said opto-isolator means.

8. The arrangement according to claim 7 wherein said second reconnecting means includes:
- a relay having a coil (100) and a bank of contacts (102), said bank of contacts when in a first state due to the energization of said coil coupling the main connection path of the concentrator to the main connection path of the trunk cable and coupling the auxiliary connection path of the concentrator to the auxiliary connection path of the trunk cable, said bank of contacts when in a second state due to said coil not being energized coupling the main connection path of the concentrator to the auxiliary connection path of the concentrator and coupling the main connection path of the trunk cable to the auxiliary connection path of the trunk cable; and
- means (132, 138, 142) responsive to the presence of said current detection signal for energizing said relay coil (100).

9. The arrangement according to claim 8 wherein said second reconnecting means further includes means (134, 132) for maintaining said relay coil (100) in an energized state independent of said current detection signal.

10. The arrangement according to claim 1 further including means (202, 204, 206, 222, 224) for selectively enabling and disabling said fixed voltage providing means (30), said first detecting means (32) and said second detecting means (42).

11. The arrangement according to claim 10 further including means (208, 210, 228, 230) for indicating the status of said fixed voltage providing means (30), said first detecting means (32) and said second detecting means (42).

12. The arrangement according to claim 11 wherein said indicating means includes a light emitting diode of a first color (208, 228) and a light emitting diode of a second color (210, 230).

* * * * *